United States Patent [19]

Vosper

[11] Patent Number: 4,465,088

[45] Date of Patent: Aug. 14, 1984

[54] CONSTRUCTION OF LOW WATER LEVEL SENSING DEVICE FOR HOT WATER BOILER

[76] Inventor: George W. Vosper, 149 Earl St., Kingston, Ontario, Canada, K7L 2H3

[21] Appl. No.: 467,759

[22] Filed: Feb. 18, 1983

Related U.S. Application Data

[63] Continuation-in-part of Ser. No. 183,749, Sep. 3, 1980, abandoned, which is a continuation-in-part of Ser. No. 60,488, Jul. 25, 1979, abandoned.

[51] Int. Cl.$^3$ .............................................. F22B 37/46
[52] U.S. Cl. ......................................... 137/1; 73/1 H; 73/304 R; 122/504; 137/94
[58] Field of Search ............................. 73/1 H, 304 R; 122/448 R, 504; 137/1, 94, 392

[56] References Cited

U.S. PATENT DOCUMENTS

| | | | |
|---|---|---|---|
| 1,977,898 | 10/1934 | Seniff | 73/304 R |
| 2,065,634 | 12/1936 | Warrick | 122/504 |
| 2,274,939 | 3/1942 | Ray | 122/504 X |
| 2,446,778 | 8/1948 | Mesh | 122/504 |
| 2,573,035 | 10/1951 | Long | 137/94 |
| 3,014,205 | 12/1961 | Boehm | 340/515 |
| 3,673,850 | 7/1972 | Burrus | 73/1 H |
| 3,831,429 | 8/1974 | Kmieck | 73/1 H |

FOREIGN PATENT DOCUMENTS 509784 9/1976 U.S.S.R. ............................... 73/1 H

Primary Examiner—Robert G. Nilson
Attorney, Agent, or Firm—Johnson & Hicks

[57] ABSTRACT

A low liquid level sensor in a hot water heating system permitting testing operability thereof in situ without draining down the system. The sensor is located in a cavity that has an opening in the bottom thereof in fluid communication with the liquid in the vessel during normal operation of the system. The end of the opening is at a lower elevation than the sensor and liquid from the vessel is in the cavity during normal operation of the system. When the liquid drops to a predetermined low level the sensor activates the safety cut-off. Valved passed means are provided exteriorly of the vessel so that a gas can be injected into the cavity to pressurize the same and drive the liquid in the cavity through the opening into the vessel simulating a low water level condition. At the simulated low water level condition operability of the sensor can be determined. Means are provided to release the gas from the cavity. The sensor is mounted by an insulator that projects into the cavity and the gas release means is spaced from the end of the cavity so that an air pocket is maintained reducing the tendency of conductive deposits to build up on the insulator. A fail safe circuit is provided avoiding malfunctioning of the cut-off safety control should there be a large build up of conductive deposits on the insulator.

15 Claims, 15 Drawing Figures

CONSTRUCTION OF LOW WATER LEVEL SENSING DEVICE FOR HOT WATER BOILER

This is a continuation-in-part of applicant's application Ser. No. 183,749 filed Sept. 3, 1980, now abandoned, which application is a continuation-in-part of application Ser. No. 060,488 filed July 25, 1979 and now abandoned.

This invention relates to an improved low liquid level sensing device in a hot water heating system that permits testing operability of the low water safety control without any major disruption in the operation of the system. Testing for operability is effected by simulating a low water condition. The invention is also directed to a sensing device so constructed as to minimize malfunctioning that often results from a build up of conductive deposits.

Codes require hot water boiler heating systems to have a low water safety cut-off device permanently installed in the system and which cannot be isolated therefrom. During normal operation of a system the cut-off devices are seldom activated and it is necessary from time to time to test their operability. Previously this was done by partially draining down the system so that the water in the boiler actually reaches the predetermined water level at which cut-off would occur. Draining down a system, however, is time consuming and particularly in high-rise buildings where the room heating radiators are at a much higher elevation than the boiler.

In existing systems a sensing probe projects into the water in the boiler and acts as a switch to energize a relay that closes contacts in the safety circuit permitting the burner to operate. If the water level drops below the lower end of the probe the relay is de-energized and the contacts open interrupting the safety circuit. Frequently, however, the devices will not perform their intended function because of conductive deposits that build up on the insulator mounting the probe in the boiler. The buildup of conductive deposits can be such that sufficient current will flow for the relay to remain energized even when the liquid drops below the probe.

A principal object of the present invention is to provide a low water sensing device which allows testing thereof by simulating a low water condition.

A further object of the present invention is to provide a low water sensing device that fails safe in the event of a build-up of conductive deposits. The fail safe circuit shuts off the boiler when there is a build-up of conductive deposits on the sensor mounting, which deposits would otherwise render the safety cut-off circuit inoperative.

To implement the foregoing object there is provided in accordance with the present invention, a hot water heating system having water in a boiler and a low water level sensor and safety cut-off device associated with the boiler and operable to shut off the system when the water in the boiler drops below a predetermined level, said low water sensor device comprising:

(a) a housing having a cavity;

(b) means mounting said housing on an upper wall of the vessel;

(c) a sensor in said cavity responsive to the liquid level therein and operably associated with the burner of the system to shut off the same when the liquid level in the boiler drops below a predetermined level;

(d) a passageway extending from said sensor into the interior of the vessel and having an open inlet and immersed in the water during normal operation of the boiler;

(e) valved passage means in said housing disposed exteriorly of the vessel for injecting a gas into said cavity to pressurize the cavity above the normal pressure therein; and (f) means, located exteriorly of the vessel, for releasing the gas from said cavity. In the preferred form of the invention the gas release means is spaced downwardly from the upper end of the cavity so as to maintain an air bubble of selected size at all times in the upper part of the cavity. This air bubble permits the use of a fail-safe circuit provided in accordance with a further aspect of the present invention.

The invention is illustrated by way of example with reference to the accompanying drawings wherein.

Figure 1:
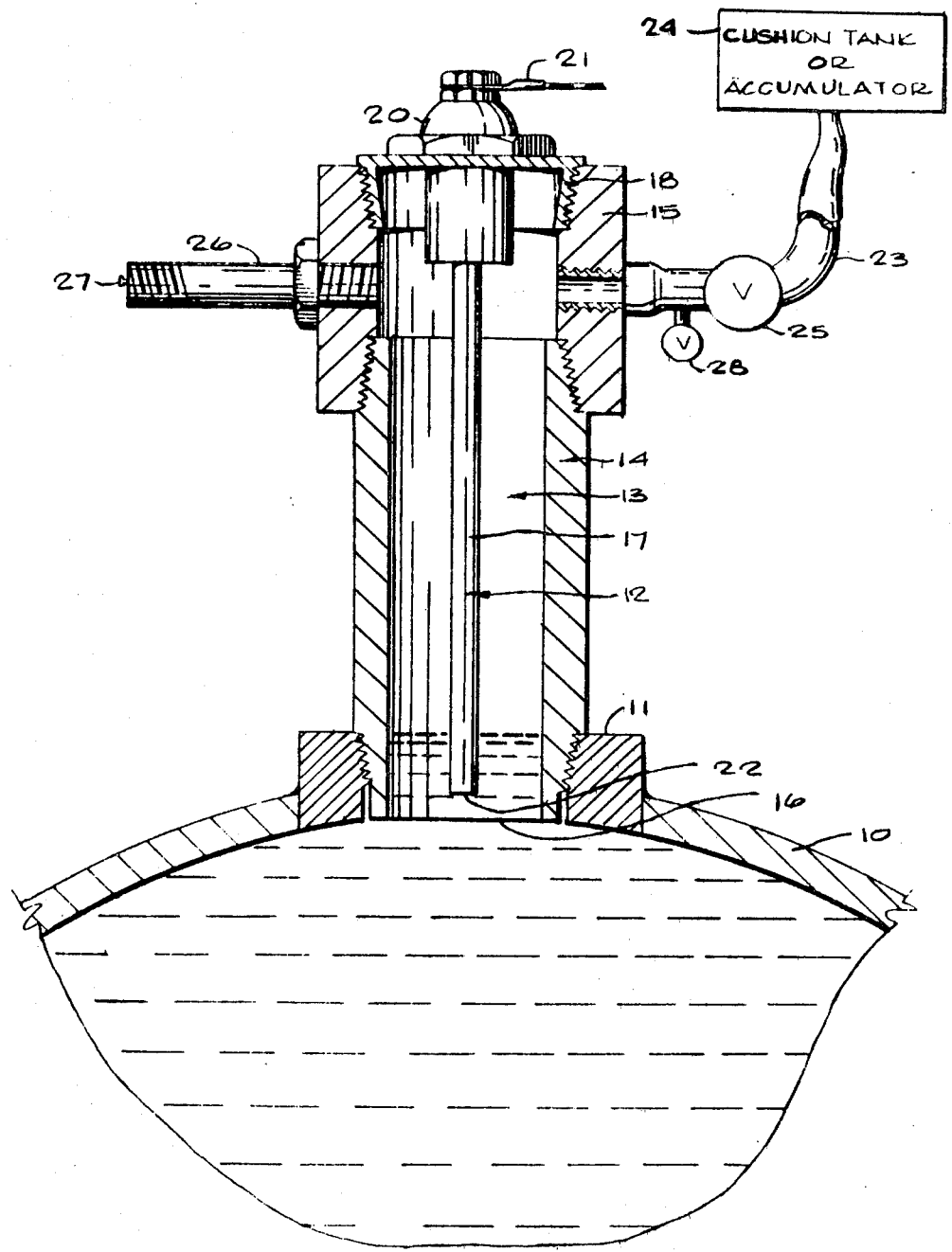
FIG. 1 is an elevational, partial sectional view illustrating one form of device constructed in accordance with the present invention installed in a boiler of a hot water heating system and wherein the level of water is dropping.
Figure 2:
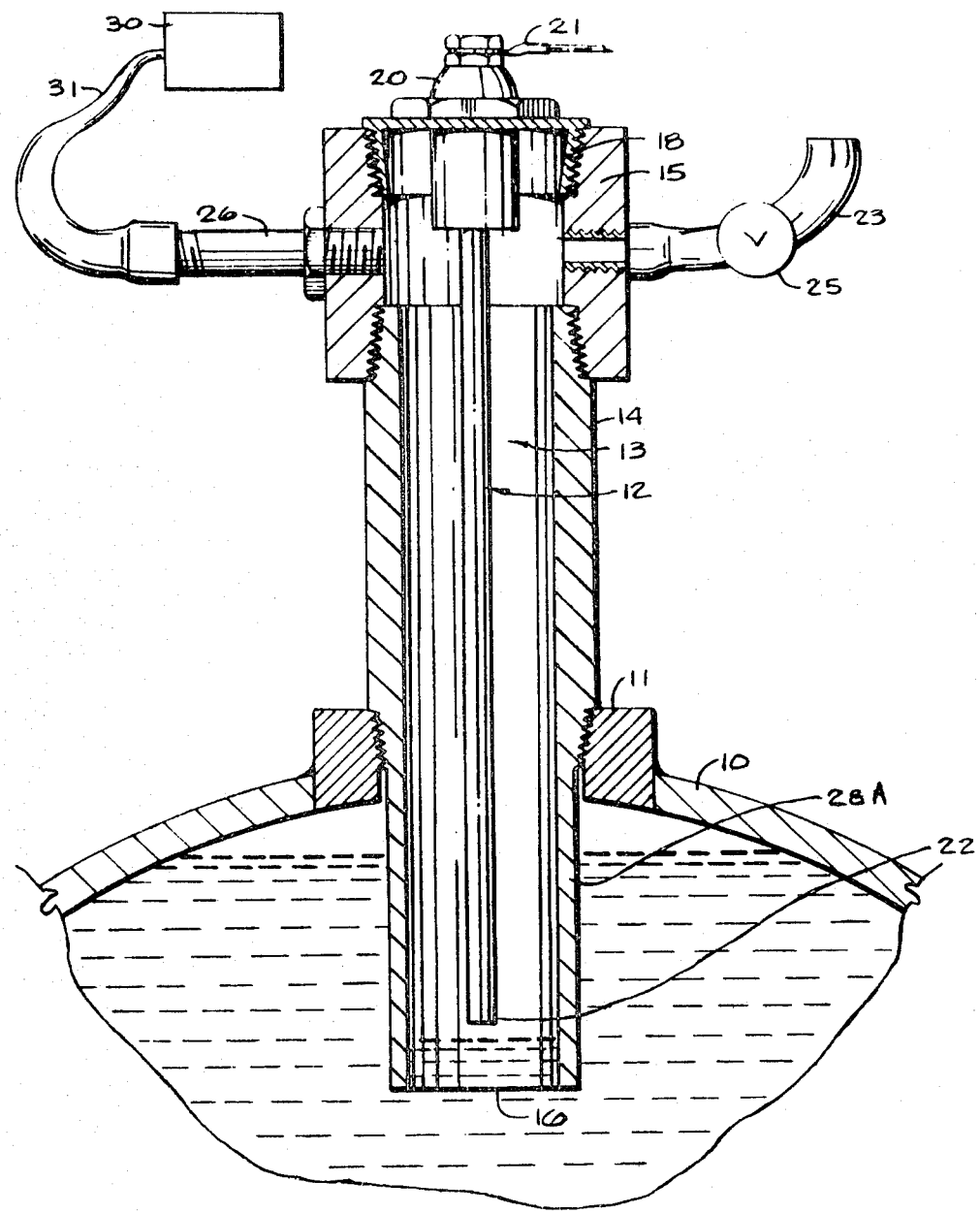
FIG. 2 is similar to Fig. 1 illustrating minor modifications to the device and wherein operability of the sensor is being tested by pressurizing the cavity containing the sensor probe.

Referring to the drawings, there is illustrated in FIGS. 1 and 2 the upper portion of a boiler or vessel 10 of a hot water heating system and which vessel or boiler has an internally threaded aperture or bushing 11 in the upper wall thereof. A liquid level sensor 12 is located in a cavity 13 of a housing 14 and which housing is mounted on the vessel so that the cavity is in fluid flow communication with the interior of the vessel.

During normal operation of the boiler, the cavity is partially filled with water contained in the boiler. When the level of water in the boiler drops below a predetermined level, the liquid level sensor deactivates the system in a conventional manner. In the embodiments illustrated, such predetermined low water level is in one instance, the position of the lower end of the pipe (FIG. 2), and in another instance the position of the free lower terminal end of the electrode sensor (FIG. 1).

In accordance with the present invention the sensor is arranged in a cavity of a housing so constructed that a low water condition can be simulated by pressurizing the cavity sufficiently to lower the water therein to such an extent that the low water cut-off circuit is activated by the sensor. A valved passageway to the cavity is provided through the housing portion disposed exteriorly of the vessel. Also, the valved passageway is spaced from the end of the cavity so that there is always, during operation, an air space thereby minimizing the build-up of conductive deposits on the insulator mounting the sensor in the housing. A fail-safe circuit is also provided and which will be described in detail hereinafter.

Referring to FIG. 1, the housing 14 comprises a pipe threaded at one end into the bushing 11 of the vessel and a coupling 15 threaded onto the other end. The lower end 16 of the pipe is open providing an inlet to the cavity 13. The sensor 12 consists of an electrode suspended from a plug 18 threaded into the upper end of the coupling 15. The electrode is electrically isolated from the plug 18 by an insulator 20 and the electrode is suitably connected in a conventional manner to the control circuitry of the system by an electrode lead 21. The electrode has a lower terminal end 22 at a higher elevation than the open end 16 of the pipe and such lower terminal end 22 is positioned at the predetermined low water level cut-off point.

The upper end of cavity 13 is in fluid flow communication with some higher point in the system by piping or conduit means 23 or alternatively with a cushion tank or accumulator 24. There is a normally open valve 25 in line 23 that can be closed when one wants to pressurize cavity 13 for testing operability of the electrode sensor. The passageway through the housing, connected to line 23, is spaced from the upper end of the cavity and which space remains filled with air during normal operation of the system. This reduces the tendency of conductive deposits to build up on the insulator 15 that can result in inoperability of the safety cut-off.

Means are provided which permits injecting a gas under pressure into the cavity 13. Such means consist of a valve stem 26 threaded into the coupling 15 and in which stem there is a valve 27. The valve and valve stem may, for example, be the same as utilized on pneumatic tires for inflating the tire. To simulate a low water situation, valve 25 is first closed and then air, by way of a hand pump or air hose connected to a compressor, is injected into the cavity 13 through the valve 27. As the air pressure builds up in the cavity the column of water is driven down below the lower terminal end of the electrode. It might be pointed out here, introduction of air into the vessel is avoided by keeping the air pressure below that necessary to drive the entire column of water in the cavity through the open end 16 of the pipe. Interruption in operation of the system (or electrical test of the circuit) quickly indicates whether or not the low water cut-off device and/or sensor is operable. After such determination has been made, the air injected into the cavity is released restoring the system to normal operation. The injected air can be released through valve 27 or alternatively through a separate air bleed off valve 28 in line 23 or simply by opening valve 25. Valve 25 is normally open allowing free flow from the cavity through conduit 23 to some higher point in the system or the accumulator.

In the embodiment illustrated in FIG. 2, the pipe has an end portion 28A that projects into the boiler vessel. Line 23 is open to atmosphere and thus valve 25 is normally closed during operation of the system. The location of the lower open end 16 of the pipe determines the low water cut-off point as the water will not drain from the cavity until the water level in the vessel drops below the end of the pipe. The area in the vessel above the pipe open end 16 provides a space for air (should there by any) to accumulate. This prevents air from accumulating in the cavity 13 and causing a false activation of the cut-off. In FIG. 2 there is also shown an air pressurizing means 30 connected to the valve stem 26 by a hose 31. The cavity 13 has been pressurized driving the liquid level to a position below the lower end 22 of the electrode for testing purposes.

The low water safety cut-off sensor illustrated in FIGS. 1 and 2 is an electrode type. However, the present method is applicable to any type of sensor utilized in a low water safety or cut-off device and may be a float.

It will be obvious from the foregoing that one requisite of the present invention is that the sensor be located in a cavity that can be pressurized by a gas to drive the liquid low enough such that the sensor performs its function of activating the cutting off device. This in all embodiments is accomplished by having the sensor at a vertical elevation higher than the inlet to the cavity and a valved passageway, into the cavity, located exteriorly of the pressure vessel.

While the invention has been described with reference to a hot water boiler heating system, it is not limited thereto but applicable to any liquid pressure system in which a low liquid level safety cut-off device is used and actuated by a sensor responsive to the liquid level.

Figure 3:
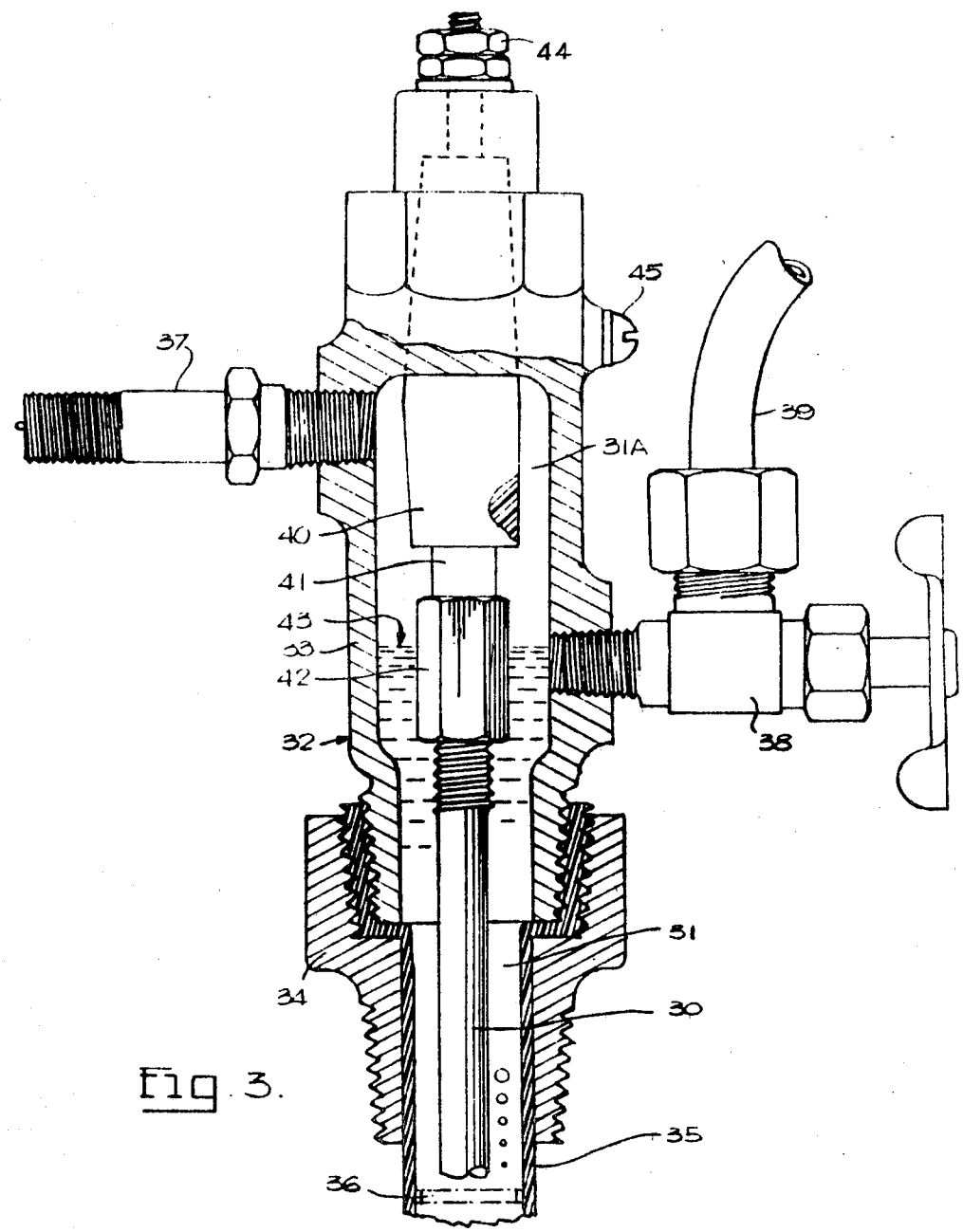
FIG. 3 is an elevational, partial sectional view of a probe constructed in accordance with the present invention.

FIG. 3 illustrates another embodiment for the construction of the sensor and housing containing the same arranged for mounting in the threaded bung of the vessel. Referring to FIG. 3 there is illustrated a liquid level sensor 30 located in a cavity 31 provided by a housing 32. The housing 32 consists of three parts; namely, an upper portion 33, a mounting portion or nipple 34 threaded onto the lower part of portion 33 and a tube 35 clampingly held at one end thereof between the housing portions 33 and 34. The tube 35 is made of an insulating material, for example material sold under E. I. DuPont de Nemours trade mark TEFLON. Alternatively, the tube 35 may be made of a conductive material, for example, copper, steel, aluminum or the like and have a ring of insulating material disposed internally thereof adjacent the lower end. This alternative is shown in FIG. 3 by broken line and identified by the reference numeral 36. The insulating tube or ring 36 as the case may be, prevents short circuiting should the probe 30 accidentally contact the sleeve when such sleeve is made of metal. The housing portion 33 has a valved inlet air passageway provided into the cavity adjacent the upper end thereof by way of a valved stem 37. The cavity 31 has an air outlet passage spaced downwardly from the upper end of the cavity by way of a shut-off valve 38 and line 39 that is connectible to an expansion tank (not shown) of the hot water heating system. The probe 30 is suspended from the top of the housing by way of an insulator 40 and is detachably connected to a rod 41 projecting downwardly therefrom by way of a threaded nut 42. As previously mentioned, the outlet passage provided by means of shut-off valve 38 is spaced downwardly from the upper end of the cavity and provides a cavity portion 31A which is an air space above the liquid level (designated 43 in the drawing). The insulator 40 is located in this air space and such an arrangement overcomes difficulties encountered in the past of conductive deposits building up on the insulator 40 which can render the safety cut-off inoperative. The probe 30 can be connected in a conventional manner to the control circuit of the system by an electrode lead 44.

In accordance with a further aspect of the invention there is provided a fail-safe circuit for the sensor.

Figure 4:
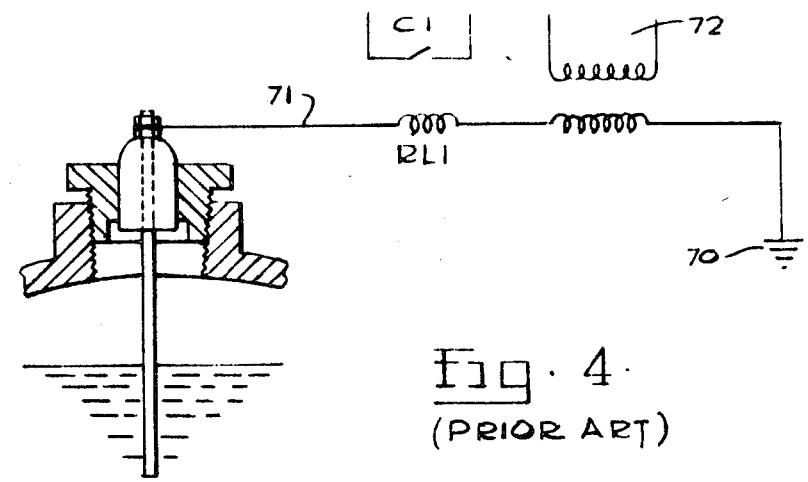
FIG. 4 is a diagrammatic view of a low water cutoff probe and circuit therefor commonly used.
Figure 5:
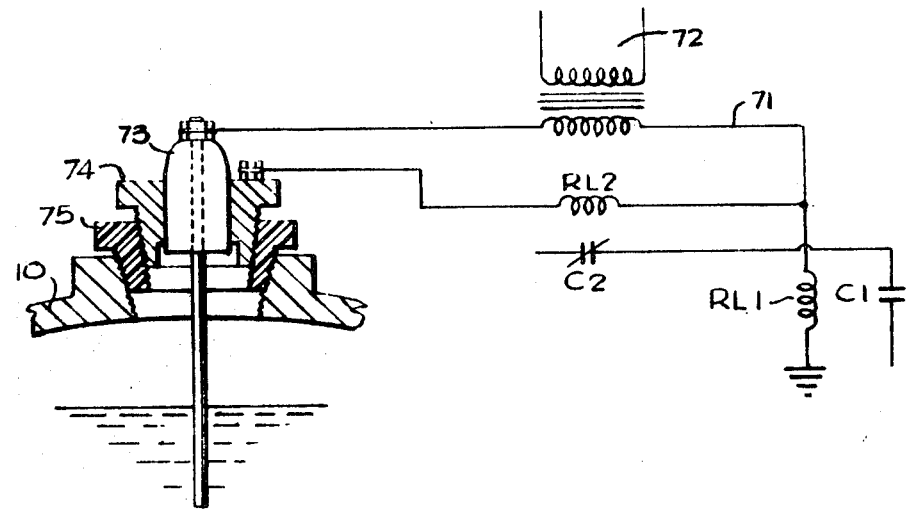
FIG. 5 is a similar view having a fail-safe circuit in accordance with the present invention.

FIG. 4 illustrates the pertinent conventional circuitry portion in a low water cut-off safety control of a hot water heating system. In the conventional systems the probe is connected to ground 70 by way of a line 71 having a relay RL1 therein. The line 71 is energized by a step down transformer 72. The liquid in the boiler is used as a switch to energize the relay RL1 which closes contacts C1 in the safety circuit for the burner of the heating system and permits the burner to operate. If the water level drops below the tip of the probe, relay RL1 is deenergized and the contacts C1 in the safety circuit open interrupting operation of the burner. Over a period of time conductive deposits build up on the lower surface of the insulator mounting the probe in the cavity and even though the water level may drop below the tip of the probe, sufficient current, because of the conductive deposits, can flow such that the relay remains energized. To overcome this difficulty a fail-safe circuit is provided as shown in FIG. 5 consisting of a second relay RL2 in a circuit connecting lines 71 to a bushing 74 mounting the sensor probe in the vessel. The sensor probe is mounted by way of an insulator 73 in the bushing 74 and the latter is electrically insulated from the vessel 10 by a bushing 75 made of an insulating material, such as for example, one identified by the trade mark TEFLON of E. I. DuPont de Nemours. Relay RL2 operates normally closed contacts C2 and has a pull-in voltage substantially less than the hold-in voltage of relay RL1. A conductive build up on the insulator 73 will eventually cause current to flow through the coil RL2. Should this occur and the liquid level remain normal nothing will happen until the resistance across the insulator (due to the conductive deposits) equals the resistance to the water. In that instance replacement of the insulator will be required. Should the liquid level drop below the probe, current flow through relay RL2 causes normally closed contacts C2 to open and interrupt the safety circuit.

Figure 6:
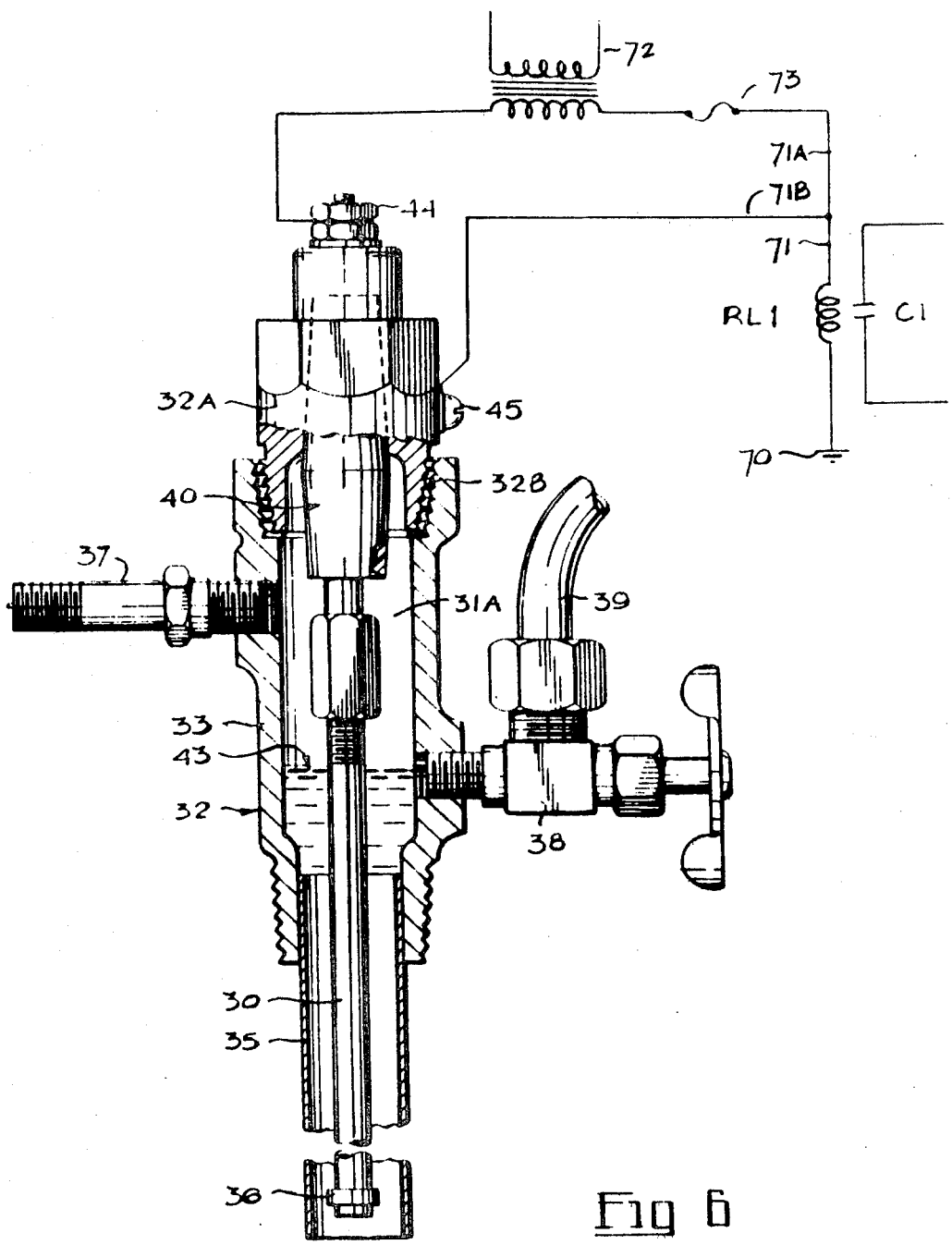
FIG. 6 is similar to FIG. 3 illustrating modifications thereto and including a fail-safe circuit provided in accordance with one aspect of the present invention.

For operability of the foregoing fail-safe circuit it is essential an air bubble remain at all times in the upper portion of the cavity preventing water in the vessel from providing a conductive path from the vessel to bushing 74. In FIG. 6 there is illustrated a preferred form of sensor device that permits testing operability of the sensor probe by simulating a low water condition and including a fail-safe circuit.

The sensor and housing illustrated in FIG. 6 is similar to that illustrated in FIG. 3 differing therefrom in the construction of the housing 32 and includes a fail-safe circuit. Referring to FIG. 6, the housing 32 threads at the lower end thereof directly into the bung or bushing in the boiler and at the opposite end the probe is mounted into a bushing 32A that threads into the upper end of the housing 32. An insulator 32B is interposed between the probe mounting bushing 32A and the housing 32 electrically insulating the mounting bushing from the remainder of the housing. The insulator 32B is a bushing threaded into the upper end of the housing 32 and bushing 32A threads into the insulator. Obviously other mounting arrangements may be employed so long as housing 32 and bushing 32A are electrically isolated from one another.

The safety cut-off and fail-safe circuit includes a relay RL1 in line 71 grounded as at 70, relay RL1 holding contact switch C1 closed during normal operation. Line 71 is connected to branch lines 71A and 71B which in turn are connected respectively to terminal 44 of probe 30 and terminal 45 on bushing 32A. Line 71A is energized by a transformer 72 and is fused by a fuse unit 73.

In the event of a breakdown across the main insulator the current will be shunted back to the transformer. If the main insulator breakdown is severe the voltage across the relay will drop and the circuit will fail-safe. The burner circuit will shut down if the probe loses water contact. Should there be a breakdown across the isolating bushing and not across the main insulator the current will shunt back to the transformer when the probe is in contact with the water and drop the voltage across the relay.

In the embodiment illustrated in FIG. 6, tube 35 may be of any material press-fit or otherwise mounted in the opening in the lower end of the housing 32. In the event tube 35 is metal a ferrule 36 of insulating material may be mounted in the inner surface of the tube or, as illustrated, on the probe 30. Tube 39 may be made of any material.

Figure 7:
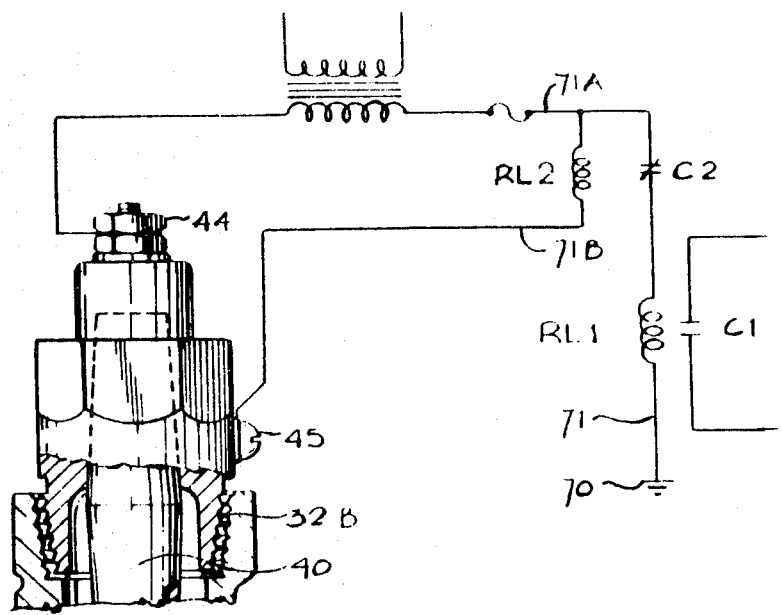
FIG. 7 is a partial view of FIG. 6 incorporating a modified fail-safe circuit.

The embodiment illustrated in FIG. 7 is the same as FIG. 6 except for the arrangement of the safety cut-off and fail-safe circuit. The system is similar to the direct shunt circuit except that in the shunt line 71B there is a relay coil RL2 with a pull-in voltage less than the hold-in voltage of the relay RL1. Relay RL2 operates normally closed contacts C2 in line 71. With a low water condition if the breakdown across the main insulator 40 is sufficient to hold in relay RL1 then relay RL2 will have pulled in and opened contacts C2 de-energizing relay RL1. Should there be a breakdown across the isolating bushing 32B the relay RL2 will pull in the primary relay RL1.

Figure 8:
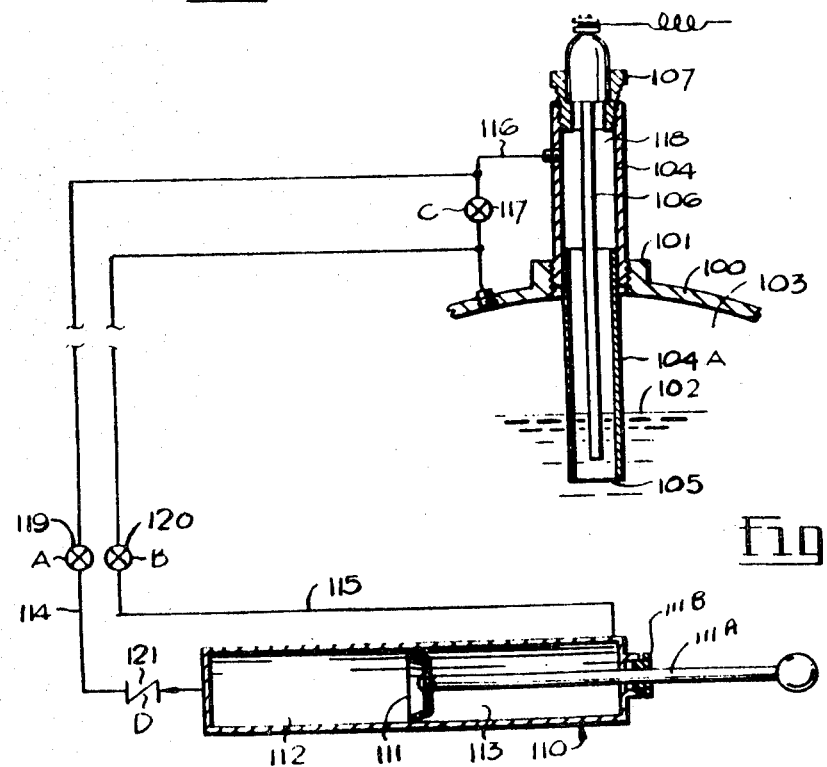
FIG. 8 is a partial sectional and schematic view of a sensor probe cut-off for a steam boiler.

Referring to FIG. 8, there is illustrated the upper portion of a steam boiler 100 having a threaded bung 101 in the upper wall thereof. Water in the boiler has an upper surface designated 102 and above that is a space 103 for steam. A tube 104 is threaded into the bung and a portion (integral with the tube or attached thereto) designated 104A extends downwardly into the vessel terminating in an open end 105 below the surface 102 of the water. A sensor probe 106 is mounted in a bushing 104 (via an insulator) that is threaded into the upper end of tube 104. A piston pump 110, connected by conduits in the arrangement as shown, is used to test operability of the probe. The pump 110 has a movable piston 111 between respective chambers 112 and 113. Piston 110 is mounted on the end of a rod 111A that projects through one end of the casing of the pump. A packing gland 111B on the rod provides a suitable seal. Chambers 112 and 113 are connected via respective conduits 114 and 115 to a conduit 116 on opposite sides of a valve 117. Conduit 116 connects at opposite ends with respectively the steam space 103 in the boiler and the chamber 118 in tube 104. Valves 119 and 120 are in respective conduits 114 and 115 and a one-way flow conduit 121 is in line 114 adjacent pump chamber 112. Valves 119 and 120 are normally closed and valve 117 is normally open.

The water in the tube will seek the level of the boiler. The fitting shown has only a low water probe. In practice three other probes would also be used. A slightly shorter one to start the feeder system. A still shorter probe to stop the feed pump. Sometimes a fourth and shortest probe is used to shut down a boiler. This high level safety is used where water carried over with the steam would cause damage. To test, valve 117 is closed and valves 119 and 120 are opened. The pump will then have steam on both sides of the plunger. Pumping will increase the pressure in the probe cavity and depress the water level in the tube. Thus the boiler LWCO can be tested while operating. There is no need for an equalizing pipe system and no water is lost during the test.

Figure 9:
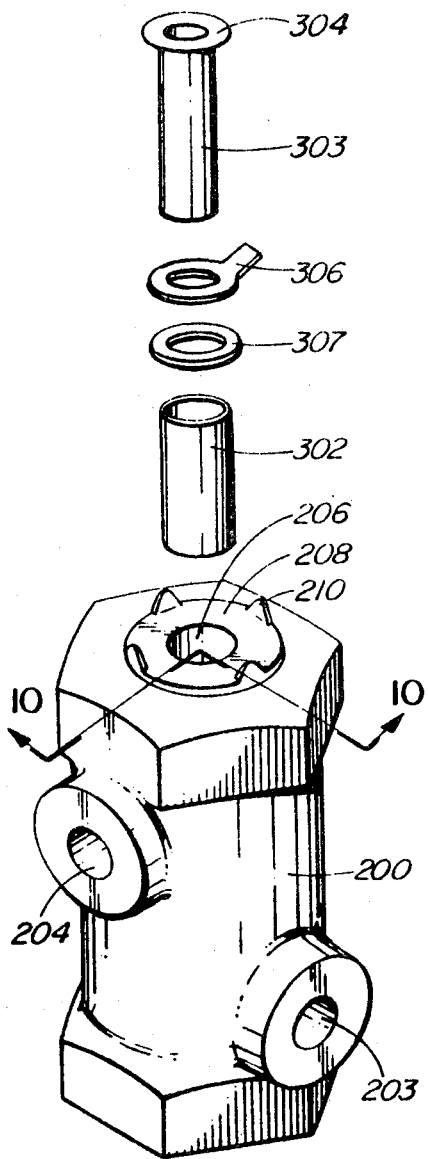
FIG. 9 is an oblique view of a cast housing for mounting the sensing probe.
Figure 10:
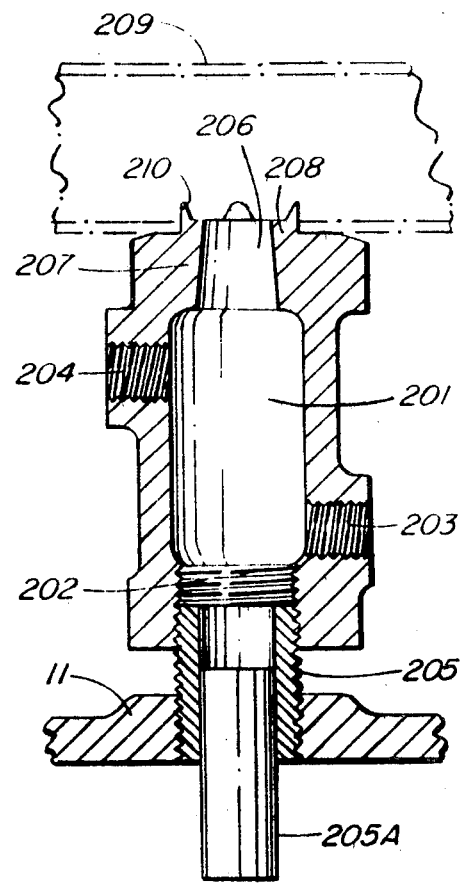
FIG. 10 is a section taken along line 10—10 of FIG. 9.
Figure 11:
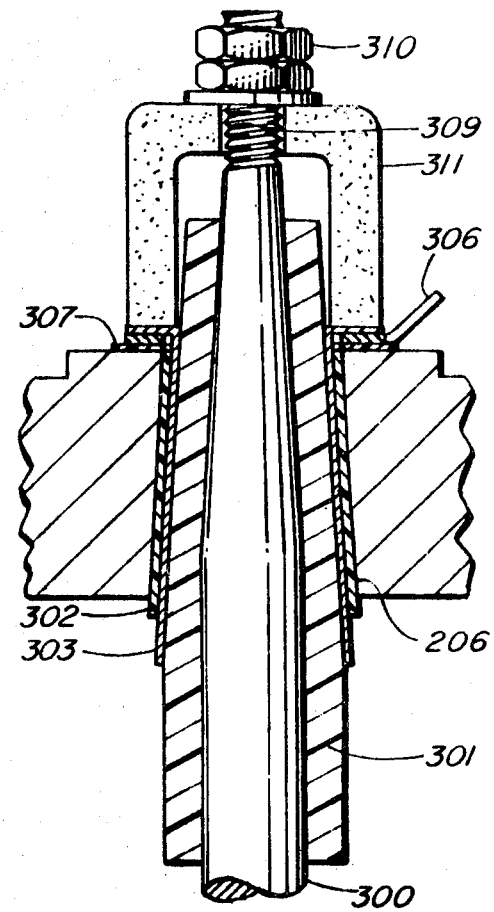
FIG. 11 is a vertical sectional view of a portion of a probe and mounting therefor that threadingly fits into the housing shown in FIGS. 9 and 10.

Referring to FIGS. 9 and 10, there is illustrated a cast housing 200 having a cavity 201 and respective threaded apertures 202, 203 and 204. Aperture 202 is located at the lower end of the cavity and is used to mount the housing on the boiler by, for example, a threaded sleeve or nipple 205 that threads into bushing 11 on the boiler. A tube 205A press fitted into the nipple, projects into the boiler. Threaded bore 204 provides a mounting for a valved air inlet (i.e. item 37, FIG. 6) and threaded aperture 203 provides means for connecting the cavity via a valved line (i.e. valve 38 and line 39 shown in FIG. 6) to some point higher in the system, for example a cushion tank. During normal operation of the boiler, valve 38 is open. Line 39 to some higher point in the system is effectively an equalizing line and thus there is maintained an air bubble of selected size in the upper part of the cavity as shown in FIG. 6. The upper end 207 of housing 200 has a tapered aperture 206 for mounting a probe as illustrated in FIG. 11. The top end of the housing has a circular upstanding protrusion 208 of such diameter as to fit into a hold of a normal electrical outlet box 209 and which may be retained in position by bending over upstanding tabs 210.

Referring to FIG. 11, there is illustrated a probe sensor 300 mounted in the tapered aperture 206 of the housing by sleeves 301 and 302 made of an electrical insulating material such as TEFLON ®. An electrical conducting sleeve 303 is interposed between the concentric sleeves 301 and 302 and has an outwardly flared flange 304 at the upper end. A spade terminal 306 (equivalent to terminal 45 in FIG. 6) is seated upon a washer 307 made of insulating material and is in electrical contact with sleeve 303 by roving outwardly directed flange 304 overlying the washer portion of the spade terminal. The bore through the bushing is tapered as are also sleeves 301, 302 and 303. The upper end of the probe 300 is threaded as at 309 and nuts 310 provide an electrical terminal connecting means as well as means to securely hold the probe in the bushing. In this regard, nuts 310 tighten against an insulated cap 311 that abuts against flange 304 of sleeve 303. It will be apparent from FIG. 11, sleeve 303 projects slightly into the cavity (201) of the housing while sleeve 301 projects further into the cavity.

Figure 12:
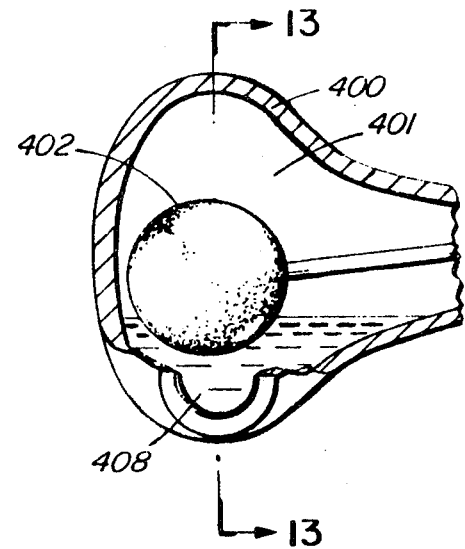
FIG. 12 is a partial sectional view of a portion of a float type low water cut-off for hot water boilers.
Figure 13:
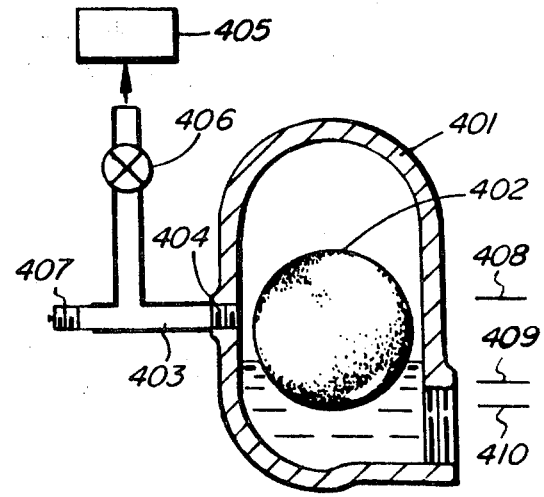
FIG. 13 is a cross-sectional view taken essentially along line 12—12 of FIG. 12.

In the foregoing, there is disclosed a probe type sensor for low water cut-off in a boiler type heating system and which may be tested simply by simulating a low water condition. Referring to FIGS. 12 and 13, there is illustrated a testable float type low water cut-off for hot water boilers, a portion of the float sensor being shown in FIG. 12 and in FIG. 13 some of the connections therefor. Referring to FIG. 12, there is illustrated a housing 400 having a cavity 401 with a float 402 therein to sense the water level in the cavity. The float is associated with a conventional safety cut-off system operable to shut off the boiler system when the water in the boiler drops below a predetermined level. In FIG. 13 there is illustrated a pipe 403 connected to the housing at 404 and which communicates with cavity 401 at a position spaced downwardly from the upper end of the cavity. The pipe 403 is connected to the cushion tank 405 of the boiler heating system through a valve 406. A valved air inlet 407 is connected to pipe 403 at a position between the housing 400 and valve 406.

The float chamber illustrated can be used with a water column or simply mounted directly on the side of the boiler. Alternatively, the larger tapped hole, i.e. hole 408 can be located in the bottom of the float chamber for mounting on top of the boiler. During normal operation, water in the cavity will rise only to the level where pipe 403 is connected as at 404 to the housing, such normal level being designated 408 in FIG. 13. Below that point, the water level in the boiler and the cavity 401 will be the same. Should the pressure equalizing line, i.e. pipe 403 become clogged or valve 406 inadvertently closed, the water in the cavity will still glug out when the boiler water falls to the level of the lower opening. Trapped gas in the chamber will help push the water out. As there will always be trapped gas in the upper part of the cavity, the float can never be held hard up against the top of the cavity as is now normal in hot water heating systems. The low water cut-off level is designated 409 in FIG. 13 and the minimum safe level 410.

To simulate a low water condition, valve 406 in the pressure equalizing line 403 is closed and a gas injected through valved air inlet 407 to depress the water level in the cavity. This simulated low water condition within the cavity will prove the operation of the low water cut-off. Re-opening the valve 406 returns the level within the cavity to normal.

Figure 14:
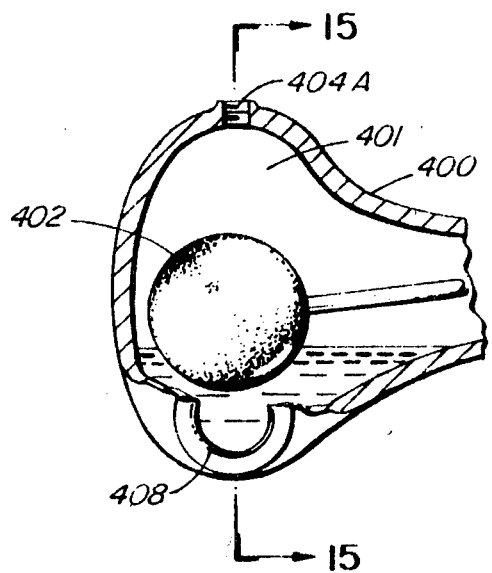
FIG. 14 is essentially the same as FIG. 12 but for a steam boiler.
Figure 15:
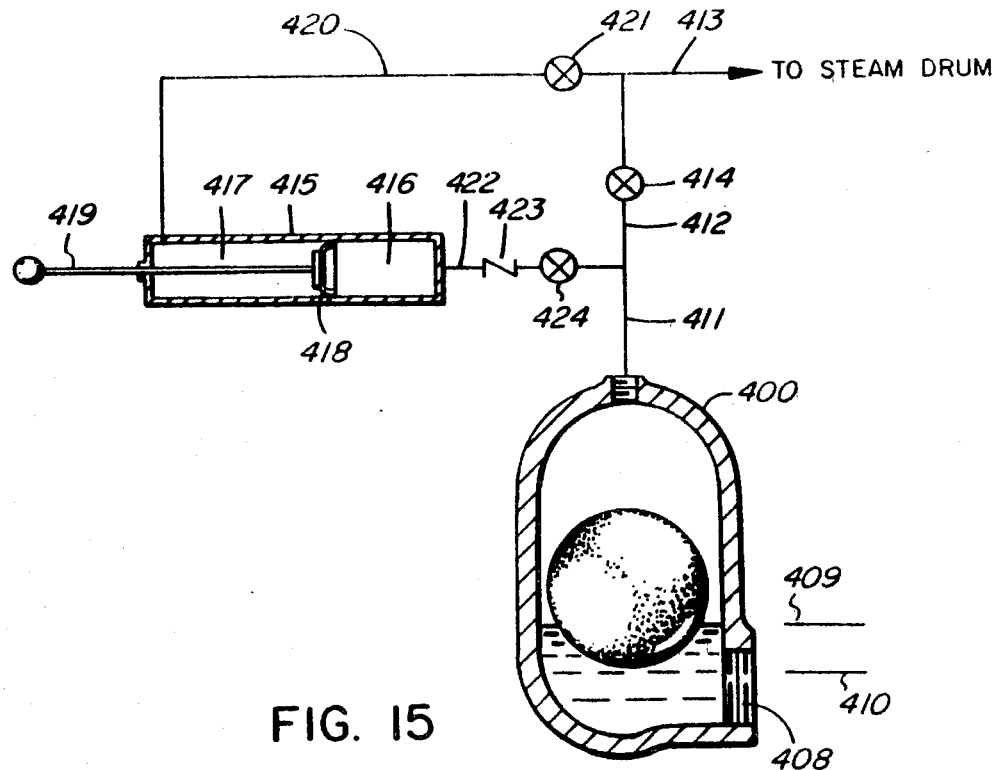
FIG. 15 is a cross-sectional view taken essentially along line 14—14 of FIG. 14.

The arrangement illustrated in FIGS. 14 and 15 is for a steam boiler and since the housing providing the cavity and having the float therein is essentially the same as FIGS. 12 and 13, the same reference numerals have been used as in FIGS. 12 and 13 to designate corresponding parts. In FIG. 13, pipe 403 is connected to the side of the housing and with reference to FIG. 14, the tapped hole for such connection is located at the upper end of the cavity and designated 404A. The low water cut-off float chamber illustrated in FIGS. 14 and 15 is for direct mounting on a steam boiler to eliminate the need for a water column. Referring to FIG. 15, the cavity 401 is connected by way of pipes 411, 412 and 413 to a steam drum, pipe 412 having a valve 414 therein. A cylinder 415 is provided and is separated into respective chambers 416 and 417 by a movable piston 418 and operable by piston rod 419. Chamber 417 is connected to pipe 413 by way of pipe or line 420 through a valve 421. Chamber 416 is connected to pipe or line 411 by line 422 through a check valve 423 and a valve 424. During normal operation, valves 421 and 424 are closed while valve 414 is open. The water level in the float chamber will reflect the level in the boiler. Should valve 414 be inadvertently closed or the equalizing line, i.e. lines 411, 412 and 413 from the float chamber to the steam drum, become plugged, water in the chamber will still glug out when the water level in the boiler falls to the lower opening. In order to simulate a low water condition, valve 414 is closed and valves 421 and 424 opened. Steam pressure in cavity 401 can then be increased by moving the piston 418 and built up sufficiently to depress the water level within the cavity to simulate a low water condition. The system permits the low water cut-off to be tested without any loss of water.

I claim:

1. In a pressurized heating system having water in a boiler and a low water level sensor and safety cut-off device associated with the boiler and operable to shut off the system when the water in the boiler drops below a predetermined level, said low water sensor device comprising:
   (a) a housing having a cavity;
   (b) means mounting said housing on the vessel such that a substantial portion of said housing, having the cavity therein, is external of the vessel;
   (c) a sensor in said cavity responsive to the liquid level therein and operably associated with the heating system to shut off the same when the liquid level in the boiler drops below a predetermined level;
   (d) a passageway in said housing having an open inlet end immersed in the water during normal operation of the boiler, said passageway providing fluid flow communication between the interior of the vessel and said cavity, the inlet to such passage being at a lower vertical elevation than the level of the water in the cavity at which the sensor is operative to shut off the system in a low water condition;
   (e) valved passage means in the portion of said housing disposed exteriorly of the vessel for injecting a gas into said cavity to pressurize the cavity above the normal pressure therein; and
   (f) normally open valved passage means in the portion of the housing located exteriorly of the vessel and connected to some higher point in the system such as an accumulator providing means for releasing the gas from said cavity and equalizing pressure between the cavity and the boiler.

2. A system as defined in claim 1 wherein said gas release means is spaced a selected distance downwardly from an upper end of said cavity and wherein the inlet end of the passageway is located adjacent an opposite end of the cavity.

3. A system as defined in claim 2 wherein said sensor is an elongate electrode suspended from the housing at the upper end of the cavity.

4. A system as defined in claim 3 wherein said electrode is suspended from an insulator that projects into the cavity and wherein the gas release means is at a lower elevation than the insulator.

5. A system as defined in claim 4 wherein said housing is threaded into a threaded bung in the upper wall of the boiler.

6. A system as defined in claim 5 wherein said housing includes a lower portion that projects into the boiler beyond the upper wall thereof.

7. A low water sensing device for use in a pressure hot water heating system to operate a safety cut-off when water in the boiler drops below a predetermined level, said device comprising a housing having an elongate cavity therein open at one end and closed at the opposite end; an elongate electrode suspended from an insulator mounted in said housing at said opposite end of the cavity, the axial length of said electrode within said cavity being less than that of the cavity whereby the end of the electrode is offset upwardly from the open lower end of the cavity; a first valved air inlet passage means through said housing into said cavity adjacent said opposite end thereof; a second air release passage means through said housing spaced a predetermined distance from said opposite end of the cavity in a direction toward said one end; and means located between said second air release passage means and said one end of the cavity for sealingly mounting said housing in an opening in the upper wall of the boiler of the pressure hot water heating system with the open end thereof in fluid flow communication with the interior of the boiler.

8. A device as defined in claim 7 wherein said insulator projects into said cavity.

9. A device as defined in claim 7 wherein said housing comprises an upper, an intermediate and a lower portion and wherein said portions are detachably interconnected.

10. A device as defined in claim 9 wherein said boiler mounting means is located on said intermediate portion of said housing.

11. A device as defined in claim 10 wherein one end of the lower portion of said housing is clampingly disposed between said upper and intermediate portions of said housing.

12. A device as defined in claim 10 wherein each of said first and second air passage means are located in the upper portion of said housing.

13. A method of testing operability of the sensor of a low water cut-off in a pressure hot water heating system having an accumulator therein without draining down the system comprising:
   (a) locating the sensor in a cavity communicating with the interior of the boiler via a passageway extending beyond the sensor, said cavity being at least partially filled with water during operation of the boiler;
   (b) injecting gas from a position exteriorly of the boiler into said cavity to pressurize the same to an extent so as to drive water in the cavity to a level so as to simulate a low water condition and thereby determine whether or not the sensor is operable; and
   (c) releasing only a portion of the injected gas from a position spaced downwardly from the upper end of the cavity to thereby maintain a gas bubble of selected size at the uppermost end of the cavity.

14. In a hot water heating system having water in a boiler and a low water level sensor and safety cut-off device associated with the boiler and operable to shut off the system when the water in the boiler drops below a predetermined level, said low water sensor device comprising:
   (a) a housing having a cavity therein;
   (b) means mounting said housing on an upper wall of the vessel;
   (c) a sensor comprising an elongate electrode suspended from an insulator that projects into the upper end of said cavity and responsive to the liquid level therein, said sensor being operably associated with the heating system to shut off the same when the liquid level in the boiler drops below a predetermined level;
   (d) a passageway in said housing extending downwardly from said sensor into the interior of the vessel and having an open inlet end immersed in the water during normal operation of the boiler, said passageway providing fluid flow communication between the interior of the vessel and said cavity, the inlet to such passage being at a lower vertical elevation than a lower terminal end of the sensor;

(e) valved passage means in said housing disposed exteriorly of the vessel for injecting a gas into said cavity to pressurize the cavity above the normal pressure therein; and (f) means, located exteriorly of the vessel, for releasing the gas from said cavity, said gas release means being at a lower elevation than the insulator from which the probe is suspended.

15. A system as defined in claim 14 wherein said housing includes a lower portion that projects into the boiler beyond the upper wall thereof.

* * * * *